(12) United States Patent
Son et al.

(10) Patent No.: US 11,347,028 B2
(45) Date of Patent: May 31, 2022

(54) OPTICAL IMAGING SYSTEM

(71) Applicant: Samsung Electro-Mechanics Co., Ltd., Suwon-si (KR)

(72) Inventors: Ju Hwa Son, Suwon-si (KR); Ki Jin Nam, Suwon-si (KR); Ju Sung Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 58 days.

(21) Appl. No.: 16/114,476

(22) Filed: Aug. 28, 2018

(65) Prior Publication Data

US 2019/0154967 A1 May 23, 2019

(30) Foreign Application Priority Data

Nov. 20, 2017 (KR) .................. 10-2017-0154877

(51) Int. Cl.
| | | |
|---|---|---|
| *G02B 3/02* | (2006.01) | |
| *G02B 13/18* | (2006.01) | |
| *G02B 9/62* | (2006.01) | |
| *G02B 27/00* | (2006.01) | |
| *G02B 13/00* | (2006.01) | |

(52) U.S. Cl.
CPC ........... *G02B 9/62* (2013.01); *G02B 13/0045* (2013.01); *G02B 27/0037* (2013.01)

(58) Field of Classification Search
CPC ........ G02B 3/04; G02B 9/62; G02B 13/0045; G02B 13/18; G02B 13/0015
USPC .................................................. 359/713, 756
See application file for complete search history.

(56) References Cited

U.S. PATENT DOCUMENTS

| | | |
|---|---|---|
| 9,128,264 B2 | 9/2015 | Huang |
| 9,217,848 B1 | 12/2015 | Chen et al. |
| 9,507,126 B2 | 11/2016 | Tang et al. |
| 9,638,895 B2 | 5/2017 | Chen et al. |
| 9,671,588 B2 | 6/2017 | Hsueh et al. |
| 9,961,244 B2 | 5/2018 | Liao et al. |
| 10,215,959 B2 * | 2/2019 | You .................. G02B 13/0045 |
| 10,241,305 B2 | 3/2019 | Hsueh et al. |
| 2013/0329306 A1 | 12/2013 | Tsai et al. |
| 2014/0368927 A1 | 12/2014 | Hsu et al. |
| 2015/0346460 A1 * | 12/2015 | Chen .................. G02B 13/0045 348/335 |

(Continued)

FOREIGN PATENT DOCUMENTS

| | | |
|---|---|---|
| CN | 202710833 U | 1/2013 |
| CN | 104122652 A | 10/2014 |

(Continued)

OTHER PUBLICATIONS

Korean Office Action dated Nov. 8, 2018 in corresponding Korean Patent Application No. 10-2017-0154877 (4 pages in English and 4 pages in Korean).

(Continued)

*Primary Examiner* — Mahidere S Sahle
(74) *Attorney, Agent, or Firm* — NSIP Law (57) ABSTRACT

An optical imaging system includes a first lens, a second lens, a third lens, a fourth lens, a fifth lens, and a sixth lens sequentially disposed from an object side. The third lens and the sixth lens have positive refractive power, and an f-number (F No.) of the optical imaging system is 1.7 or less.

11 Claims, 6 Drawing Sheets

(56) References Cited

U.S. PATENT DOCUMENTS

| | | |
|---|---|---|
| 2016/0033744 A1 | 2/2016 | Tsai et al. |
| 2016/0054543 A1 | 2/2016 | Nabeta |
| 2016/0223790 A1 | 8/2016 | Liao et al. |
| 2016/0231532 A1 | 8/2016 | Huang et al. |
| 2017/0052348 A1 | 2/2017 | Tang et al. |
| 2017/0090156 A1 | 3/2017 | Hsu et al. |
| 2017/0090161 A1 | 3/2017 | Chen et al. |
| 2017/0108665 A1 | 4/2017 | Huang |
| 2017/0146776 A1 | 5/2017 | Kang et al. |
| 2017/0212333 A1 | 7/2017 | Huang |
| 2018/0024331 A1 | 1/2018 | Matsunaga |
| 2018/0052304 A1* | 2/2018 | Wu .................. H04N 5/2353 |
| 2018/0100993 A1* | 4/2018 | Park .................. G02B 13/0045 |
| 2018/0203208 A1* | 7/2018 | Hsueh .................. G02B 3/04 |
| 2018/0252897 A1 | 9/2018 | Hsueh et al. |

FOREIGN PATENT DOCUMENTS

| | | |
|---|---|---|
| CN | 104238082 A | 12/2014 |
| CN | 105319682 A | 2/2016 |
| CN | 105334595 A | 2/2016 |
| CN | 106468820 A | 3/2017 |
| CN | 107121756 A | 9/2017 |
| CN | 107272161 A | 10/2017 |
| JP | 2000-330014 A | 11/2000 |
| JP | WO2016/125613 A1 | 8/2016 |
| KR | 10-2017-0059244 A | 5/2017 |
| TW | 201627713 A | 8/2016 |
| TW | I600940 B | 10/2017 |
| TW | I601995 B | 10/2017 |

OTHER PUBLICATIONS

Chinese Office Action dated Sep. 24, 2020 issued in counterpart to Chinese Patent Application No. 201811381829.5 (4 pages in English, 7 in Chinese).

Korean Office Action dated Jan. 26, 2021 in counterpart Korean Patent Application No. 10-2019-0082692 (4 pages in English, 4 pages in Korean).

Korean Office Action dated Sep. 8, 2021 in counterpart Korean Patent Application No. 10-2019-0082692 (9 pages in English and 5 pages in Korean).

Chinese Office Action dated Jul. 2, 2021 issued in counterpart Chinese Patent Application No. 201811381829.5 (10 pages in English and 11 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2017-0154877 filed on Nov. 20, 2017, in the Korean Intellectual Property Office, the entire disclosure of which is incorporated herein by reference for all purposes.

BACKGROUND

1. Field

This application relates to an optical imaging system including six lenses.

2. Description of the Background

Small camera modules may be mounted in mobile communications terminals. For example, small camera modules may be mounted in thin devices such as mobile phones, or the like. Such small camera modules include an optical imaging system including a small number of lenses so that they may also be thin. For example, the optical imaging system of the small camera module may include four or less lenses.

However, such an optical imaging system may have a high f-number (F No.), such that it may be difficult for the optical imaging system to be used in a small camera module having high performance.

The above information is presented as background information only to assist with an understanding of the present disclosure. No determination has been made, and no assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially disposed from an object side. The third lens and the sixth lens have positive refractive power, and an f-number (F No.) of the optical imaging system is 1.7 or less.

The first lens may have positive refractive power.

The second lens may have negative refractive power.

The fourth lens may have negative refractive power.

TTL/(IMG HT) may be less than 1.5 in which TTL is a distance from an object-side surface of the first lens to an image plane, and IMG HT is half of a diagonal length of the imaging plane.

In another general aspect, an optical imaging system includes a first lens, a second lens, a third lens, a fourth lens, a fifth lens, and a sixth lens sequentially disposed from an object side. An object-side surface and an image-side surface of the fourth lens are concave. An image-side surface of the sixth lens is concave, and an f-number (F No.) of the optical imaging system is 1.7 or less.

An object-side surface of the first lens may be convex.

An object-side surface of the second lens may be convex.

An object-side surface of the third lens may be convex.

An image-side surface of the fifth lens may be concave.

An object-side surface of the sixth lens may be convex.

An entire field of view (FOV) of the optical imaging system may be 75° or more.

R2/R1 may be greater than 20, in which R1 is a radius of curvature of an object-side surface of the first lens, and R2 is a radius of curvature of an image-side surface of the first lens.

R8/R10 may be greater than 0 and less than 2.0, in which R8 is a radius of curvature of the image-side surface of the fourth lens, and R10 is a radius of curvature of an image-side surface of the fifth lens.

R11/R12 may be greater than 0 and less than 1.2, in which R11 is a radius of curvature of an object-side surface of the sixth lens, and R12 is a radius of curvature of the image-side surface of the sixth lens.

D45/D56 may be greater than 5.0 and less than 10, in which D45 is a distance from the image-side surface of the fourth lens to an object-side surface of the fifth lens, and D56 is a distance from an image-side surface of the fifth lens to an object-side surface of the sixth lens.

In another general aspect, an optical imaging system includes a first lens, a second lens, a third lens, a fourth lens, a fifth lens, and a sixth lens sequentially disposed from an object side toward an imaging plane. The first lens, the third lens, and the sixth lens each have a refractive index less than a refractive index of the second lens, the fourth lens, and the fifth lens, and an f-number (F No.) of the optical imaging system is 1.7 or less.

The first lens, the third lens, and the sixth lens may each have a refractive index of 1.56 or less, and the second lens, the fourth lens, and the fifth lens may each have a refractive index of 1.6 or more.

The first lens and the third lens may each have an Abbe number greater than an Abbe number of the second lens, the fourth lens, the fifth lens, and the sixth lens.

The first lens and the third lens may each have an Abbe number of 55 or more, and the second lens may have an Abbe number of 22 or less.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

It is noted that use of the term "may" herein with respect to an example or embodiment, for example, as to what an example or embodiment may include or implement, means that at least one example or embodiment exists where such a feature is included or implemented while all examples and embodiments are not limited thereto.

In addition, in this application, a first lens refers to a lens closest to an object (or a subject), while a sixth lens refers to a lens closest to an imaging plane (or an image sensor). In addition, all of radii of curvature and thicknesses of lenses, a distance from the object-side surface of the first lens to the image plane (TTL), a half of a diagonal length of the imaging plane (IMG HT), and focal lengths of the lenses are represented by millimeters (mm). Further, thicknesses of the lenses, gaps between the lenses, and the TTL are distances in optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex.

An aspect of the present disclosure may provide an optical imaging system capable of being used in a small camera module having high performance.

An optical imaging system may include six lenses sequentially disposed from an object side toward the imaging plane. For example, the optical imaging system may include a first lens, a second lens, a third lens, a fourth lens, a fifth lens, and a sixth lens that are sequentially disposed. The first to sixth lenses may be disposed with a predetermined interval therebetween. For example, a predetermined interval may be formed between an image-side surface of the first lens and an object-side surface of the second lens.

The first lens may have refractive power. For example, the first lens may have positive refractive power.

One surface of the first lens may be convex. For example, an object-side surface of the first lens may be convex. The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to the plastic. For example, the first lens may be formed of glass.

The first lens may have a predetermined refractive index. For example, the refractive index of the first lens may be less than 1.6. The first lens may have a predetermined Abbe number. For example, the Abbe number of the first lens may be 50 or more.

The second lens may have refractive power. For example, the second lens may have negative refractive power.

One surface of the second lens may be convex. For example, an object-side surface of the second lens may be convex. The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may also be formed of glass.

The second lens may have a refractive index greater than that of the first lens. For example, the refractive index of the second lens may be 1.6 or more. The second lens may have a predetermined Abbe number. For example, the Abbe number of the second lens may be less than 24.

The third lens may have refractive power. For example, the third lens may have positive refractive power.

One surface of the third lens may be convex. For example, an object-side surface of the third lens may be convex. The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The third lens may have a refractive index that is substantially similar to that of the first lens. For example, the refractive index of the third lens may be less than 1.6. The third lens may have an Abbe number similar to that of the first lens. For example, the Abbe number of the third lens may be 50 or more.

The fourth lens may have refractive power. For example, the fourth lens may have negative refractive power.

One surface of the fourth lens may be concave. For example, an object-side surface of the fourth lens may be concave. The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fourth lens may have a refractive index greater than that of the first lens. For example, the refractive index of the fourth lens may be 1.6 or more. The fourth lens may have an Abbe number smaller than that of the first lens. For example, the Abbe number of the fourth lens may be less than 30.

The fifth lens may have refractive power. For example, the fifth lens may have negative refractive power.

One surface of the fifth lens may be concave. For example, an image-side surface of the fifth lens may be concave. The fifth lens may have an aspherical surface. For example, both surfaces of the fifth lens may be aspherical. The fifth lens may have an inflection point. For example, one or more inflection points may be formed on an object-side surface or the image-side surface of the fifth lens.

The fifth lens may be formed of a material having high light transmissivity and excellent workability. For example, the fifth lens may be formed of plastic. However, a material of the fifth lens is not limited to plastic. For example, the fifth lens may be formed of glass.

The fifth lens may have a refractive index greater than that of the first lens. For example, the refractive index of the fifth lens may be 1.6 or more. The fifth lens may have an Abbe number smaller than that of the first lens. For example, the Abbe number of the fifth lens may be 30 or less.

The sixth lens may have refractive power. For example, the sixth lens may have positive refractive power.

One surface of the sixth lens may be concave. For example, an image-side surface of the sixth lens may be concave. The sixth lens may have inflection points. For example, one or more inflection points may be formed on both surfaces of the sixth lens. The sixth lens may have an aspherical surface. For example, both surfaces of the sixth lens may be aspherical.

The sixth lens may be formed of a material having high light transmissivity and excellent workability. For example, the sixth lens may be formed of plastic. However, a material of the sixth lens is not limited to plastic. For example, the sixth lens may be formed of glass.

The sixth lens may have a refractive index that is substantially similar to that of the first lens. For example, the refractive index of the sixth lens may be less than 1.6. The sixth lens may have an Abbe number greater than that of the fifth lens. For example, the Abbe number of the sixth lens may be 50 or more.

The first to sixth lenses may have an aspherical shape, as described above. For example, at least one surface of all of the first to sixth lenses may be aspherical. Here, an aspherical surface of each lens may be represented by the following Equation 1:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The optical imaging system may further include a stop. The stop may be disposed between the second lens and the third lens.

The optical imaging system may further include a filter. The filter may block a partial wavelength of incident light incident through the first to sixth lenses. For example, the filter may block an infrared wavelength of the incident light.

The optical imaging system may further include an image sensor. The image sensor may provide the imaging plane on which light refracted by the lenses may be imaged. For example, a surface of the image sensor may form the imaging plane. The image sensor may be configured to implement a high level of resolution.

The optical imaging system may satisfy the following Conditional Expressions 2-6:

$$TTL/(IMG\ HT)<1.5 \quad (2)$$

$$20<R2/R1 \quad (3)$$

$$0<R8/R10<2.0 \quad (4)$$

$$0<R11/R12<1.2 \quad (5)$$

$$5.0<D45/D56<10 \quad (6)$$

In the above Conditional Expressions 2-7, TTL is a distance from the object-side surface of the first lens to the image plane, IMG HT is half of a diagonal length of the imaging plane, R1 of a radius of curvature of the object-side surface of the first lens, R2 is a radius of curvature of an image-side surface of the first lens, R8 is a radius of curvature of an image-side surface of the fourth lens, R10 is a radius of curvature of the image-side surface of the fifth lens, R11 is a radius of curvature of an object-side surface of the sixth lens, R12 is a radius of curvature of the image-side surface of the sixth lens, D45 is a distance from the image-side surface of the fourth lens to an object-side surface of the fifth lens, and D56 is a distance from the image-side surface of the fifth lens to an object-side surface of the sixth lens.

Next, optical imaging systems according to several examples will be described.

Figure 1:
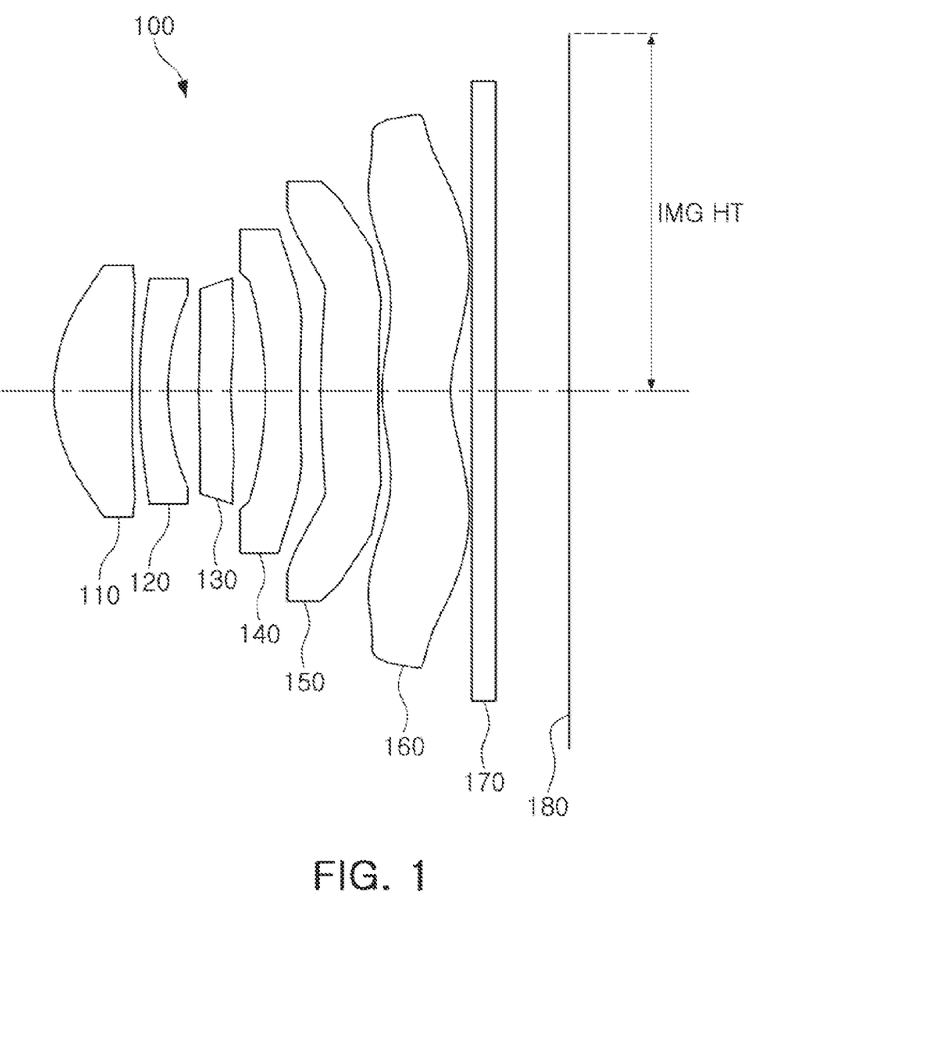
FIG. 1 is a view illustrating a first example of an optical imaging system.

A first example of an optical imaging system will be described with reference to FIG. 1.

The first example of the optical imaging system 100 may include a plurality of lenses having refractive power. For example, the optical imaging system 100 may include a first lens 110, a second lens 120, a third lens 130, a fourth lens 140, a fifth lens 150, and a sixth lens 160.

The first lens 110 may have positive refractive power, and an object-side surface thereof may be convex and an image-side surface thereof may be concave. The second lens 120 may have negative refractive power, and an object-side surface thereof may be convex and an image-side surface thereof may be concave. The third lens 130 may have positive refractive power, and an object-side surface thereof may be convex and an image-side surface thereof may be concave. The fourth lens 140 may have negative refractive power, and an object-side surface thereof may be concave and an image-side surface thereof may be concave. The fifth lens 150 may have negative refractive power, and an object-side surface thereof may be concave and an image-side surface thereof may be concave. In addition, inflection points may be formed on the object-side surface and the image-side surface of the fifth lens 150. The sixth lens 160 may have positive refractive power, and an object-side surface thereof may be convex and an image-side surface thereof may be concave. In addition, inflection points may be formed on both surfaces of the sixth lens 160. For example, the object-side surface of the sixth lens may be convex in a paraxial region and be concave in an area surrounding the paraxial region, and the image-side surface thereof may be concave in a paraxial region and be convex in an area surrounding the paraxial region.

The first lens 110, the third lens 130, and the sixth lens 160 may have relatively low refractive indices. For example, the refractive index of the first lens 110, the refractive index of the third lens 130, and the refractive index of the sixth lens 160 may be 1.56 or less. The second lens 120, the fourth lens 140, and the fifth lens 150 may have relatively high refractive indices. For example, the refractive index of the second lens 120, the refractive index of the fourth lens 140, and the refractive index of the fifth lens 150 may be 1.6 or more. The second lens 120 may have the highest refractive index in the optical imaging system 100. For example, the refractive index of the second lens 120 may be 1.66 or more. The sixth lens 160 may have the lowest refractive index in the optical imaging system 100. For example, the refractive index of the sixth lens 160 may be 1.54 or less.

The first lens 110 and the third lens 130 may have the greatest Abbe number in the optical imaging system 100. For example, the Abbe number of the first lens 110 and the third lens 130 may be 55 or more. The second lens 120 may have the smallest Abbe number in the optical imaging system 100. For example, the Abbe number of the second lens 120 may be 22 or less.

The optical imaging system 100 may include a stop ST. For example, the stop ST may be disposed between the second lens 120 and the third lens 130. The stop ST disposed as described above may control an amount of light incident to an imaging plane 180.

The optical imaging system 100 may include a filter 170. For example, the filter 170 may be disposed between the sixth lens 160 and the imaging plane 180. The filter 170 disposed as described above may block infrared light incident to the imaging plane 180.

The optical imaging system 100 may include an image sensor. The image sensor may provide the imaging plane 180 on which light refracted through the lenses is imaged. The image sensor may convert an optical signal imaged on the imaging plane 180 into an electrical signal.

The optical imaging system 100 configured as described above may have a low f-number (F No.). For example, the F No. of the optical imaging system in the first example may be 1.680.

Figure 2:
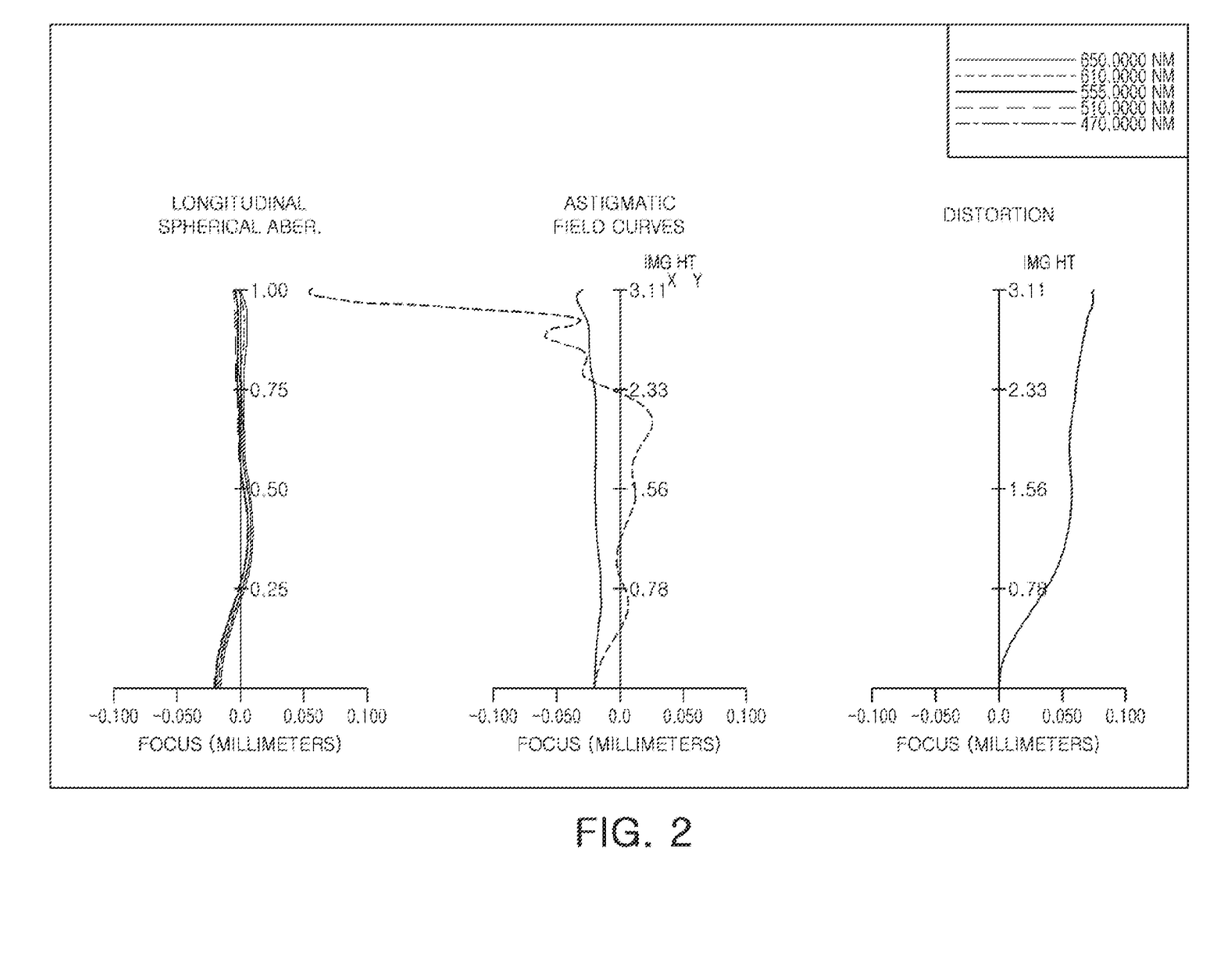
FIG. 2 illustrates curves representing aberration characteristics of the optical imaging system illustrated in FIG. 1.

The optical imaging system in the first example may have aberration characteristics as illustrated in FIG. 2. Table 1 represents characteristics of lenses of the optical imaging system in the first example, and Table 2 represents aspherical characteristics of the optical imaging system of the first example.

TABLE 1

First Example

| | | f = 3.7664 | F No. = 1.68 | | FOV = 77.7 | | TLL = 4.500 |
|---|---|---|---|---|---|---|---|
| Surface No. | | Radius of Curvature | Thickness/ Distance | Refractive Index | Abbe Number | Effective Diameter | Focal Length |
| S1 | First Lens | 1.5026 | 0.7086 | 1.546 | 56.11 | 1.12 | 2.867 |
| S2 | | 31.2157 | 0.0336 | | | 1.07 | |
| S3 | Second Lens | 6.2140 | 0.2500 | 1.667 | 20.35 | 1.00 | −5.937 |
| S4 | | 2.3795 | 0.2670 | | | 0.87 | |
| S5 | Third Lens | 6.8145 | 0.3284 | 1.546 | 56.11 | 0.91 | 18.296 |
| S6 | | 21.0816 | 0.2608 | | | 1.01 | |
| S7 | Fourth Lens | −48.3257 | 0.3107 | 1.644 | 23.52 | 1.05 | −23.738 |
| S8 | | 22.4174 | 0.2117 | | | 1.44 | |
| S9 | Fifth Lens | −40.4106 | 0.4626 | 1.644 | 23.52 | 1.61 | −20.813 |
| S10 | | 20.1460 | 0.0314 | | | 1.86 | |
| S11 | Sixth Lens | 1.4273 | 0.6000 | 1.536 | 55.66 | 2.24 | 49.507 |
| S12 | | 1.2871 | 0.1853 | | | 2.65 | |
| S13 | Filter | infinity | 0.2100 | 1.518 | 64.17 | 2.67 | |
| S14 | | infinity | 0.6200 | | | 2.73 | |
| S15 | Imaging Plane | infinity | 0.0200 | | | 3.15 | |

TABLE 2

| 1$^{st}$ Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.503 | 31.216 | 6.214 | 2.379 | 6.814 | 21.082 | −48.326 | 22.417 | −40.411 | 20.146 | 1.427 | 1.287 |
| K | −0.418 | 0.996 | 0.964 | −1.000 | −0.995 | 1.000 | 0.453 | −0.291 | 41.061 | −49.945 | −1.996 | −0.830 |
| A | −0.003 | 0.004 | −0.022 | 0.013 | −0.010 | −0.032 | −0.050 | 0.044 | 0.387 | 0.070 | −0.525 | −0.408 |
| B | 0.045 | −0.058 | −0.017 | −0.045 | −0.087 | 0.398 | −0.050 | −0.485 | −0.947 | −0.070 | 0.487 | 0.282 |
| C | 0.090 | 0.095 | 0.033 | 0.062 | −0.120 | −3.023 | 0.022 | 0.834 | 1.100 | −0.078 | −0.347 | −0.167 |
| D | 0.093 | −0.065 | 0.050 | 0.062 | 0.293 | 10.280 | −0.038 | −0.761 | −0.85 | 0.125 | 0.17 | 0.07 |
| E | −0.057 | −0.042 | −0.032 | −0.031 | −0.271 | −21.285 | −0.050 | 0.289 | 0.379 | −0.083 | −0.053 | −0.019 |
| F | 0.008 | 0.094 | −0.050 | −0.062 | 0.051 | 26.147 | −0.036 | 0.042 | −0.073 | 0.031 | 0.010 | 0.003 |
| G | 0.009 | −0.066 | 0.042 | −0.062 | 0.033 | −17.499 | 0.050 | −0.060 | −0.001 | −0.006 | −0.001 | 0.000 |
| H | −0.006 | 0.017 | −0.005 | 0.145 | 0.105 | 4.957 | 0.001 | 0.012 | 0.001 | 0.001 | 0.000 | 0.000 |

Figure 3:
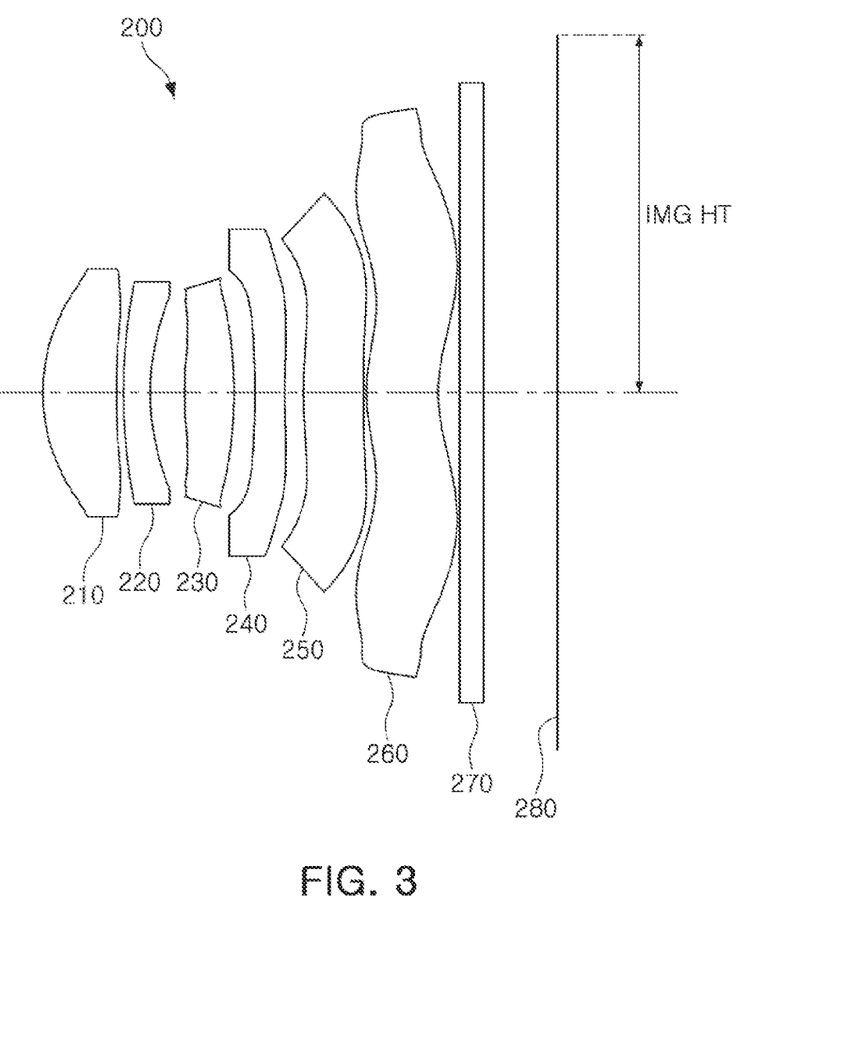
FIG. 3 is a view illustrating a second example of an optical imaging system.

A second example of an optical imaging system will be described with reference to FIG. 3.

The optical imaging system 200 in the second example may include a plurality of lenses having refractive power. For example, the optical imaging system 200 may include a first lens 210, a second lens 220, a third lens 230, a fourth lens 240, a fifth lens 250, and a sixth lens 260.

The first lens 210 may have positive refractive power, and an object-side surface thereof may be convex and an image-side surface thereof may be concave. The second lens 220 may have negative refractive power, and an object-side surface thereof may be convex and an image-side surface thereof may be concave. The third lens 230 may have positive refractive power, and an object-side surface thereof may be convex and an image-side surface thereof may be convex. The fourth lens 240 may have negative refractive power, and an object-side surface thereof may be concave and an image-side surface thereof may be concave. The fifth lens 250 may have negative refractive power, and an object-side surface thereof may be convex and an image-side surface thereof may be concave. In addition, inflection points may be formed on the object-side surface and the image-side surface of the fifth lens 250. The sixth lens 260 may have positive refractive power, and an object-side surface thereof may be convex and an image-side surface thereof may be concave. In addition, inflection points may be formed on both surfaces of the sixth lens 260. For example, the object-side surface of the sixth lens may be convex in a paraxial region and be concave in an area surrounding the paraxial region, and the image-side surface thereof may be concave in a paraxial region and be convex in an area surrounding the paraxial region.

The first lens 210, the third lens 230, and the sixth lens 260 may have relatively low refractive indices. For example, the refractive index of the first lens 210, the refractive index of the third lens 230, and the refractive index of the sixth lens 260 may be 1.56 or less. The second lens 220, the fourth lens 240, and the fifth lens 250 may have relatively high refractive indices. For example, the refractive index of the second lens 220, the refractive index of the fourth lens 240, and the refractive index of the fifth lens 250 may be 1.6 or more. The second lens 220 may have the highest refractive index in the optical imaging system 200. For example, the refractive index of the second lens 220 may be 1.66 or more. The sixth lens 260 may have the lowest refractive index in the optical imaging system 200. For example, the refractive index of the sixth lens 260 may be 1.54 or less.

The first lens 210 and the third lens 230 may have the greatest Abbe number in the optical imaging system 200. For example, the Abbe number of the first lens 210 and the third lens 230 may be 55 or more. The second lens 220 may have the smallest Abbe number in the optical imaging system 200. For example, the Abbe number of the second lens 220 may be 22 or less.

The optical imaging system 200 may include a stop ST. For example, the stop ST may be disposed between the second lens 220 and the third lens 230. The stop ST disposed as described above may control an amount of light incident to an imaging plane 280.

The optical imaging system 200 may include a filter 270. For example, the filter 270 may be disposed between the sixth lens 260 and the imaging plane 280. The filter 270 disposed as described above may block infrared light incident to the imaging plane 280.

The optical imaging system 200 may include an image sensor. The image sensor may provide the imaging plane 280 on which light refracted through the lenses is imaged. The image sensor may convert an optical signal imaged on the imaging plane 280 into an electrical signal.

The optical imaging system 200 configured as described above may have a low F No. For example, the F No. of the optical imaging system according to the present exemplary embodiment may be 1.689.

Figure 4:
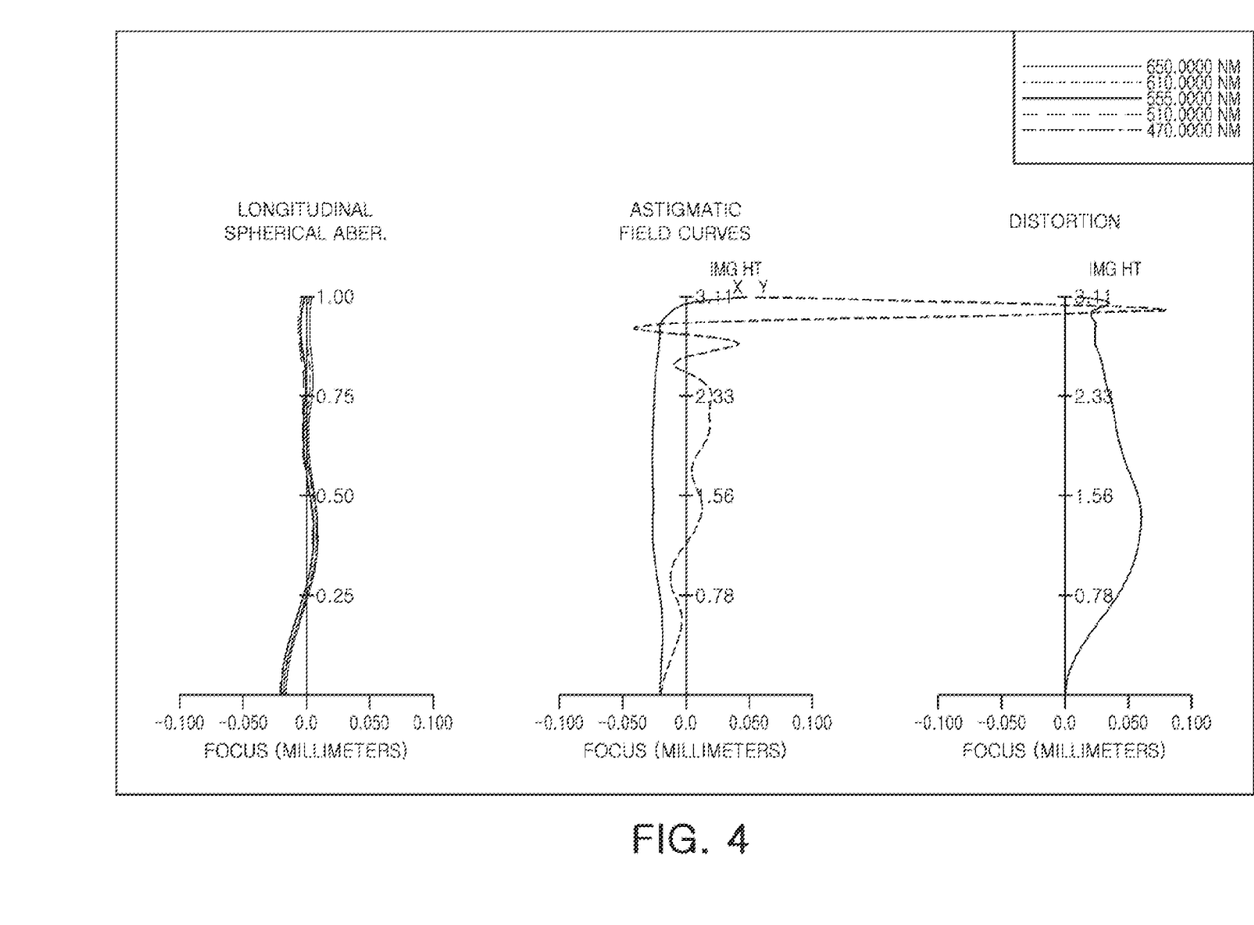
FIG. 4 illustrates curves representing aberration characteristics of the optical imaging system illustrated in FIG. 3.

The optical imaging system in the second example may have aberration characteristics as illustrated in FIG. 4. Table 3 represents characteristics of lenses of the optical imaging system in the second example, and Table 4 represents aspherical characteristics of the optical imaging system of the second example.

TABLE 3

Second Example

| | | f = 3.681 | F No. = 1.689 | | FOV = 79.8 | TLL = 4.500 | |
|---|---|---|---|---|---|---|---|
| Surface No. | | Radius of Curvature | Thickness/ Distance | Refractive Index | Abbe Number | Effective Diameter | Focal Length |
| S1 | First Lens | 1.5231 | 0.6814 | 1.546 | 56.11 | 1.09 | 2.853 |
| S2 | | 57.5948 | 0.0250 | | | 1.05 | |
| S3 | Second Lens | 5.6996 | 0.2400 | 1.667 | 20.35 | 0.98 | −6.366 |
| S4 | | 2.3921 | 0.3236 | | | 0.86 | |
| S5 | Third Lens | 19.5991 | 0.3733 | 1.546 | 56.11 | 0.91 | 15.750 |
| S6 | | −15.2153 | 0.2096 | | | 1.01 | |
| S7 | Fourth Lens | −20.7675 | 0.2700 | 1.656 | 21.53 | 1.08 | −12.964 |
| S8 | | 14.4658 | 0.1645 | | | 1.44 | |
| S9 | Fifth Lens | 352.6032 | 0.5212 | 1.644 | 23.52 | 1.56 | −112.921 |
| S10 | | 60.2537 | 0.0250 | | | 1.86 | |
| S11 | Sixth Lens | 1.4487 | 0.6191 | 1.536 | 55.66 | 2.24 | 188.566 |
| S12 | | 1.2505 | 0.1973 | | | 2.55 | |
| S13 | Filter | infinity | 0.2100 | 1.518 | 64.17 | 2.66 | |
| S14 | | infinity | 0.6200 | | | 2.73 | |
| S15 | Imaging Plane | infinity | 0.0200 | | | 3.15 | |

TABLE 4

| 2$^{nd}$ Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.523 | 57.595 | 5.700 | 2.392 | 19.599 | −15.215 | −20.767 | 14.466 | 352.603 | 60.254 | 1.449 | 1.252 |
| K | −0.455 | 0.762 | 0.721 | −0.994 | −0.995 | 1.000 | 0.453 | −0.291 | 42.178 | −49.952 | −2.056 | −0.828 |
| A | −0.002 | −0.012 | −0.037 | −0.005 | −0.020 | −0.025 | −0.044 | 0.059 | 0.406 | 0.12 | −0.464 | −0.406 |
| B | 0.046 | −0.013 | 0.041 | −0.009 | −0.155 | 0.339 | 0.005 | −0.530 | −0.977 | −0.100 | 0.386 | 0.278 |
| C | −0.093 | 0.075 | 0.044 | 0.062 | 0.232 | −2.561 | −0.012 | 0.937 | 1.100 | −0.063 | −0.259 | −0.168 |
| D | 0.085 | −0.095 | −0.031 | 0.050 | −0.310 | 8.395 | −0.050 | −0.906 | −0.80 | 0.118 | 0.13 | 0.07 |
| E | −0.040 | −0.031 | −0.050 | −0.049 | 0.140 | −16.736 | −0.050 | 0.443 | 0.300 | −0.078 | −0.039 | −0.019 |
| F | −0.003 | 0.088 | 0.029 | −0.062 | 0.053 | 19.845 | 0.046 | −0.069 | −0.020 | 0.029 | 0.007 | 0.003 |
| G | 0.009 | −0.036 | 0.050 | −0.062 | 0.053 | −12.853 | −0.003 | −0.017 | −0.017 | −0.006 | −0.001 | 0.000 |
| H | −0.005 | 0.001 | −0.033 | 0.212 | 0.025 | 3.541 | −0.001 | 0.005 | 0.003 | 0.000 | 0.000 | 0.000 |

Figure 5:
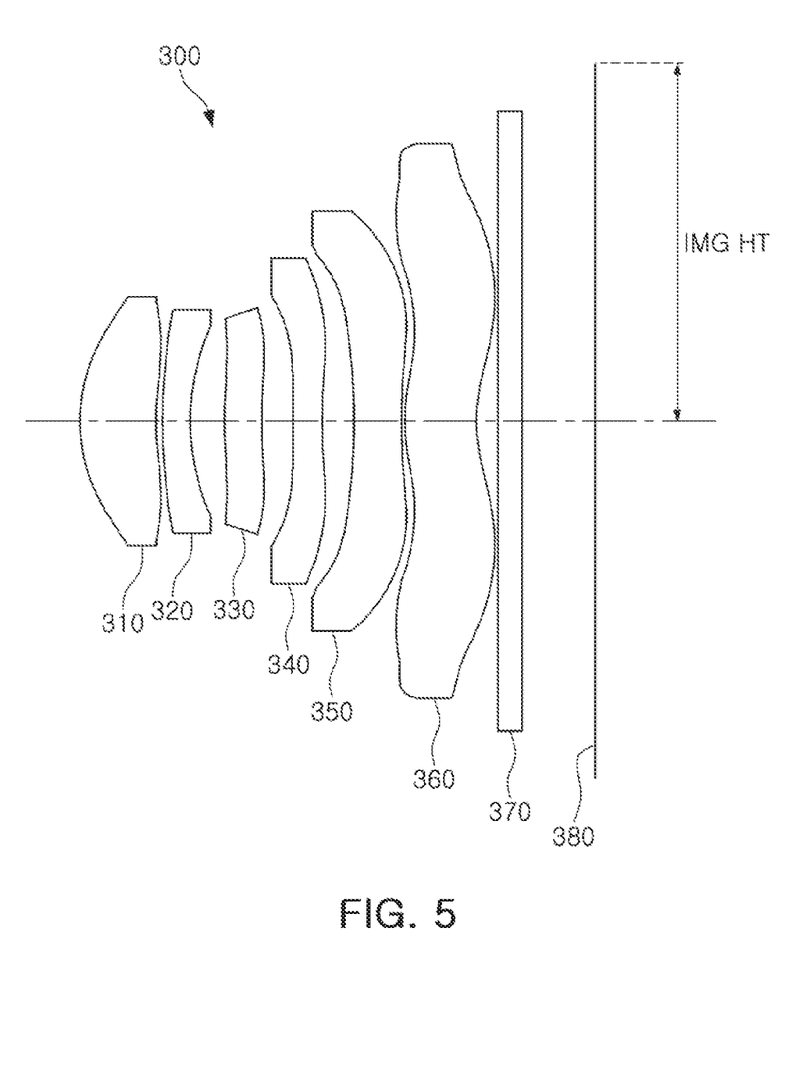
FIG. 5 is a view illustrating a third example of an optical imaging system.

An optical imaging system according to a third example will be described with reference to FIG. 5.

The optical imaging system 300 according to the third example may include a plurality of lenses having refractive power. For example, the optical imaging system 300 may include a first lens 310, a second lens 320, a third lens 330, a fourth lens 340, a fifth lens 350, and a sixth lens 360.

The first lens 310 may have positive refractive power, and an object-side surface thereof may be convex and an image-side surface thereof may be concave. The second lens 320 may have negative refractive power, and an object-side surface thereof may be convex and an image-side surface thereof may be concave. The third lens 330 may have positive refractive power, and an object-side surface thereof may be convex and an image-side surface thereof may be concave. The fourth lens 340 may have negative refractive power, and an object-side surface thereof may be concave and an image-side surface thereof may be concave. The fifth lens 350 may have negative refractive power, and an object-side surface thereof may be concave and an image-side surface thereof may be concave. In addition, inflection points may be formed on the object-side surface and the image-side surface of the fifth lens 350. The sixth lens 360 may have positive refractive power, and an object-side surface thereof may be convex and an image-side surface thereof may be concave. In addition, inflection points may be formed on both surfaces of the sixth lens 360. For example, the object-side surface of the sixth lens may be convex in a paraxial region and be concave in an area surrounding the paraxial region, and the image-side surface thereof may be concave in a paraxial region and be convex in an area surrounding the paraxial region.

The first lens 310, the third lens 330, and the sixth lens 360 may have relatively low refractive indices. For example, the refractive index of the first lens 310, the refractive index of the third lens 330, and the refractive index of the sixth lens 360 may be 1.56 or less. The second lens 320, the fourth lens 340, and the fifth lens 350 may have relatively high refractive indices. For example, the refractive index of the second lens 320, the refractive index of the fourth lens 340, and the refractive index of the fifth lens 350 may be 1.6 or more. The second lens 320 may have the highest refractive index in the optical imaging system 300. For example, the refractive index of the second lens 320 may be 1.66 or more. The sixth lens 360 may have the lowest refractive index in the optical imaging system 300. For example, the refractive index of the sixth lens 360 may be 1.54 or less.

The first lens 310 and the third lens 330 may have the greatest Abbe number in the optical imaging system 300. For example, the Abbe number of the first lens 310 and the third lens 330 may be 55 or more. The second lens 320 may have the smallest Abbe number in the optical imaging system 300. For example, the Abbe number of the second lens 320 may be 22 or less.

The optical imaging system 300 may include a stop ST. For example, the stop ST may be disposed between the second lens 320 and the third lens 330. The stop ST disposed as described above may control an amount of light incident to an imaging plane 380.

The optical imaging system 300 may include a filter 370. For example, the filter 370 may be disposed between the sixth lens 360 and the imaging plane 380. The filter 370 disposed as described above may block infrared light incident to the imaging plane 380.

The optical imaging system 300 may include an image sensor. The image sensor may provide the imaging plane 380 on which light refracted through the lenses is imaged. The image sensor may convert an optical signal imaged on the imaging plane 380 into an electrical signal.

The optical imaging system 300 configured as described above may have a low F No. For example, the F No. of the optical imaging system according to the third example may be 1.683.

Figure 6:
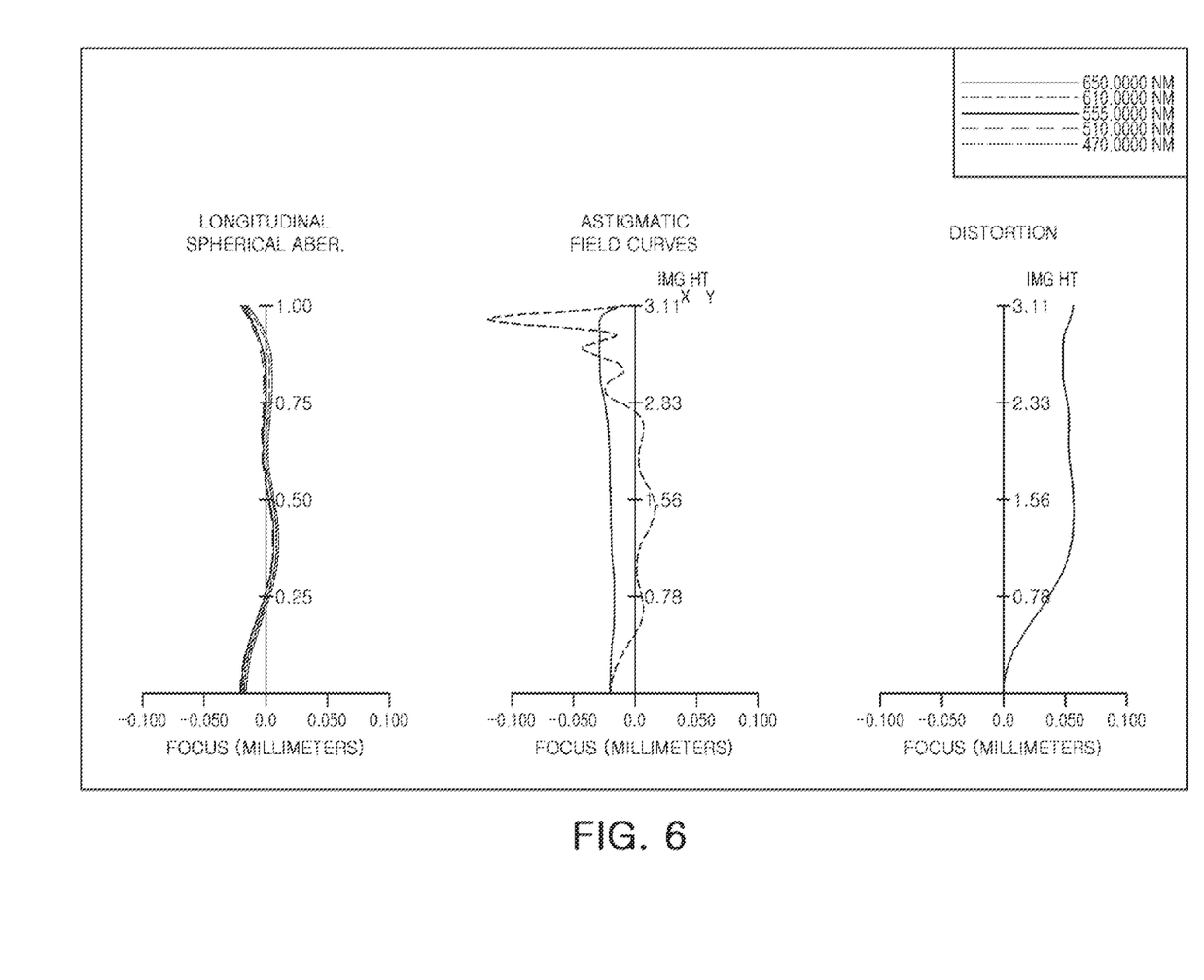
FIG. 6 illustrates curves representing aberration characteristics of the optical imaging system illustrated in FIG. 5.

The optical imaging system according to the third example may have aberration characteristics as illustrated in FIG. 6. Table 5 represents characteristics of lenses of the optical imaging system in the third example, and Table 6 represents aspherical characteristics of the optical imaging system of the third example.

TABLE 5

| | Third Example | | | | | |
|---|---|---|---|---|---|---|
| | f = 3.719 | | F No. = 1.683 | FOV = 78.6 | | TLL = 4.500 |
| Surface No. | | | Radius of Curvature | Thickness/ Distance | Refractive Index | Abbe Number | Effective Diameter | Focal Length |
| S1 | First Lens | | 1.5129 | 0.6857 | 1.546 | 56.11 | 1.11 | 2.885 |
| S2 | | | 32.1803 | 0.0277 | | | 1.06 | |
| S3 | Second Lens | | 5.7630 | 0.2500 | 1.667 | 20.35 | 0.99 | −5.988 |
| S4 | | | 2.3179 | 0.3066 | | | 0.86 | |

TABLE 5-continued

Third Example

| f = 3.719 | | F No. = 1.683 | FOV = 78.6 | | TLL = 4.500 | |
|---|---|---|---|---|---|---|
| Surface No. | | Radius of Curvature | Thickness/ Distance | Refractive Index | Abbe Number | Effective Diameter | Focal Length |
| S5 | Third Lens | 9.0802 | 0.3380 | 1.546 | 56.11 | 0.91 | 17.302 |
| S6 | | 231.4954 | 0.2541 | | | 1.01 | |
| S7 | Fourth Lens | −45.5701 | 0.2700 | 1.644 | 23.52 | 1.12 | −21.808 |
| S8 | | 20.3492 | 0.1881 | | | 1.44 | |
| S9 | Fifth Lens | −427.3125 | 0.4901 | 1.644 | 23.52 | 1.54 | −24.098 |
| S10 | | 16.1114 | 0.0250 | | | 1.86 | |
| S11 | Sixth Lens | 1.4156 | 0.6237 | 1.536 | 55.66 | 2.22 | 39.731 |
| S12 | | 1.2832 | 0.1911 | | | 2.55 | |
| S13 | Filter | infinity | 0.2100 | 1.518 | 64.17 | 2.66 | |
| S14 | | infinity | 0.6200 | | | 2.73 | |
| S15 | Imaging Plane | infinity | 0.0200 | | | 3.15 | |

TABLE 6

| 3rd Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.513 | 32.180 | 5.763 | 2.318 | 9.080 | 231.495 | −45.570 | 20.349 | −427.313 | 16.111 | 1.416 | 1.283 |
| K | −0.410 | 0.996 | 0.202 | −0.694 | −0.995 | 1.000 | 0.453 | −0.291 | 41.061 | −49.945 | −2.001 | −0.832 |
| A | −0.002 | 0.001 | −0.023 | 0.000 | −0.013 | −0.002 | −0.021 | 0.052 | 0.393 | 0.088 | −0.496 | −0.397 |
| B | 0.047 | −0.044 | 0.000 | −0.014 | −0.171 | 0.145 | −0.006 | −0.421 | −0.954 | −0.069 | 0.450 | 0.271 |
| C | −0.093 | 0.057 | 0.050 | 0.062 | 0.204 | −1.638 | 0.000 | 0.666 | 1.100 | −0.092 | −0.308 | −0.162 |
| D | 0.093 | 0.013 | 0.022 | 0.062 | −0.208 | 5.718 | −0.050 | −0.531 | −0.88 | 0.132 | 0.15 | 0.07 |
| E | −0.056 | −0.089 | −0.050 | −0.036 | 0.052 | −11.903 | 0.016 | 0.159 | 0.413 | −0.081 | −0.044 | −0.019 |
| F | 0.008 | 0.016 | −0.026 | −0.062 | 0.053 | 14.581 | −0.048 | 0.042 | −0.085 | 0.029 | 0.008 | 0.003 |
| G | 0.009 | 0.045 | 0.050 | −0.062 | 0.053 | −9.667 | 0.046 | −0.037 | 0.000 | −0.006 | −0.001 | 0.000 |
| H | −0.007 | −0.021 | −0.013 | 0.185 | 0.031 | 2.707 | −0.011 | 0.006 | 0.002 | 0.000 | 0.000 | 0.000 |

Table 7 represents values of Conditional Expressions of the optical imaging systems according to the first to third examples. As seen in Table 7, the optical imaging systems according to the first to third examples may satisfy all numerical ranges of Conditional Expressions 2-6 set forth above.

TABLE 7

| Conditional Expression | First Example | Second Example | Third Example |
|---|---|---|---|
| TTL/ImgH | 1.447 | 1.447 | 1.447 |
| R2/R1 | 20.775 | 37.814 | 21.270 |
| R8/R10 | 1.113 | 0.240 | 1.263 |
| R11/R12 | 1.109 | 1.158 | 1.103 |
| D45/D56 | 6.745 | 6.580 | 7.523 |

As set forth above, in the examples disclosed herein, an optical imaging system appropriate for a small camera module having high performance may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, and a sixth lens sequentially disposed from an object side to an image side,
wherein an object-side surface and an image-side surface of the fourth lens are concave,
wherein an object-side surface of the second lens is convex,
wherein an image-side surface of the third lens is concave,
wherein an object-side surface of the sixth lens is convex, and an image-side surface of the sixth lens is concave,
wherein an f-number (F No.) of the optical imaging system is 1.7 or less,
wherein the optical imaging system has a total of six lens elements with refractive power, and
wherein the fifth lens has negative refractive power.

2. The optical imaging system of claim 1, wherein an object-side surface of the first lens is convex.

3. The optical imaging system of claim 1, wherein an object-side surface of the second lens is convex.

4. The optical imaging system of claim 1, wherein an object-side surface of the third lens is convex.

5. The optical imaging system of claim 1, wherein an image-side surface of the fifth lens is concave.

6. The optical imaging system of claim 1, wherein an entire field of view (FOV) of the optical imaging system is 75° or more.

7. The optical imaging system of claim 1, wherein 20<R2/R1 in which R1 is a radius of curvature of an object-side surface of the first lens, and R2 is a radius of curvature of an image-side surface of the first lens.

8. The optical imaging system of claim 1, wherein 0<R8/R10<2.0 in which R8 is a radius of curvature of the image-side surface of the fourth lens, and R10 is a radius of curvature of an image-side surface of the fifth lens.

9. The optical imaging system of claim 1, wherein 0<R11/R12<1.2 in which R11 is a radius of curvature of an object-side surface of the sixth lens, and R12 is a radius of curvature of the image-side surface of the sixth lens.

10. The optical imaging system of claim 1, wherein 5.0<D45/D56<10 in which D45 is a distance from the image-side surface of the fourth lens to an object-side surface of the fifth lens, and D56 is a distance from an image-side surface of the fifth lens to an object-side surface of the sixth lens.

11. The optical imaging system of claim 1, wherein the sixth lens has positive refractive power.

\* \* \* \* \*